March 29, 1955 L. M. NOLEN 2,705,044
SAFETY BELTS FOR SEATS OF VEHICLES
Filed April 28, 1952

INVENTOR.
LAWRENCE M. NOLEN

ATTORNEY

Patented Mar. 29, 1955

2,705,044

SAFETY BELTS FOR SEATS OF VEHICLES

Lawrence M. Nolen, San Diego, Calif., assignor of one-half to Vachel W. Conn, San Diego, Calif.

Application April 28, 1952, Serial No. 284,758

1 Claim. (Cl. 155—189)

My invention relates to safety belts for seats of vehicles, and its objects are to provide a noose self-tightening belt for binding and securing against dislodgement or displacement from his seat the driver or occupant of an automobile or other vehicle when said vehicle is subjected to a sudden shock occasioned by impact or stoppage through accident or other rigous cause; to furnish a safety belt of this description which may readily be fitted, applied and removed to and from the occupant of said vehicle while seated therein, and which does not interfere with the normal movement of any part of his body; to render the parts of the said belt readily accessible for inspection, adjustment, removal, replacement, renewal or repair; and generally to provide an automatically self tightening safety belt which is simple in character, economical of construction, efficient in action and of prolonged life and durability. These and other objects will appear from the accompanying drawing and as hereinafter more particularly set forth and described.

My invention primarily consists in forming a self tightening safety belt of flexible substance having two parts slidably connected by link of solid material, the belt being arranged to encompass the back of a vehicle seat and the body of its occupant, and to become tightened as a noose against his body and firmly to hold and secure the same from displacement upon any sudden arrest or distortion of the travel of the vehicle.

My invention further consists in adapting the said belt for use with the back of said seat when hinged thereto; in which case the noose tightening and binding of the belt against the body of the occupant is accomplished by the forward movement of the seat occasioned by said arrest or distortion of momentum of the vehicle.

My invention further consists in adapting the said belt for use with the fixed back of the seat of a vehicle; in which case the said noose tightening and binding of the belt is brought about solely by the forward movement of the body of the occupant caused by arrested momentum of the vehicle.

My invention further consists of novel features of construction, and combinations and arrangements of parts illustrated in the drawing and hereinafter more specially referred to and claimed.

Attention is hereby directed to the accompanying drawing illustrating two preferred forms of my invention in which similar numerals of designation refer to similar parts throughout the several views, and in which—

Figure 1:
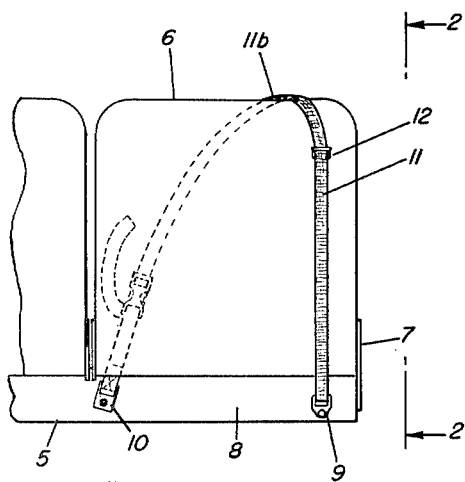
Figure 1 is a rear elevational view of the hinged back of a conventional divided back and bottom seat of an automobile, showing one form of application of my safety belt especially adapted thereto.
Figure 2:
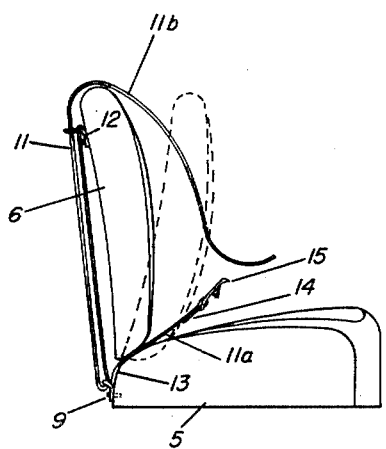
Fig. 2 is a side elevational view of the seat and safety belt shown in Fig. 1, looking in the direction indicated by the arrows 2—2.

Referring to the form of my invention shown in Figs. 1 and 2, of the drawing, I have there shown a common form of automobile seat, having the bottom portion 5 to which is hingedly attached the back 6, normally held against backward movement in slightly inclined position, but permitting a limited forward swing thereof upon its hinge. The said back is a conventional form of back, being a frame covered by upholstery and shaped to accommodate the usual passenger, and being provided with a usual type of hinge 7 affixed to said frame and to said bottom, and permitting the limited swing just referred to. To the rear wall 8 of the said bottom portion 5 are firmly secured the eye-plates 9 and 10, spaced widely apart, and having openings therein shaped to engage the webs of the belt 11 and to permit the free running of said webs therethrough. Near the top of the rear wall of said back 6, and securely attached to the frame thereof, is the eye-plate 12, similar in character and shape to the eye-plates 9 and 10.

As shown in Figs. 1 and 2, the form of belt there illustrated is made in two parts, 11a and 11b, the part 11a being somewhat short in length and having one of its ends 13 affixed to the eye-plate 9, while its other end 14 extends forwardly under the back 6 and between said back and the said bottom, and passing upwardly is secured to the buckle 15; while the part 11b is much longer than the part 11a, and has one end secured to the eye-plate 12, and passing downwardly is roved through the eye-plate 9, and thence proceeding upwardly goes through the opening of the eye-plate 12, over the top of the back 6 to the front thereof, where its free end portion reaching downwardly in a diagonal direction across the chest of the occupant engages with the buckle 15 to which it is firmly secured upon being fitted to the body of said occupant; the arrangement being such that upon the automobile being subjected to any violent shock while travelling in a forward direction, the back 6 will swing forward, and the belt will thereby become tightened by the noose binding action of part 11b of said belt, and the occupant will become anchored in said seat and securely held against dislodgement therefrom.

Figure 3:
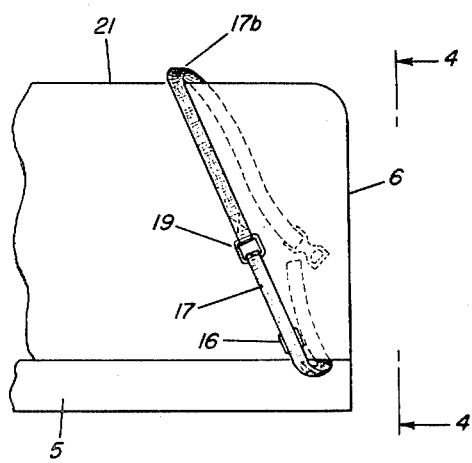
Fig. 3 is a rear elevational view of the immovably secured back and bottom of the permanently affixed parts of a conventional seat of an automobile, showing another form of my improved safety belt particularly adapted therefor.
Figure 4:
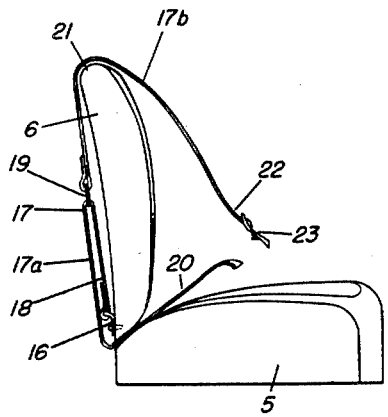
Fig. 4 is a side elevational view of the seat and safety belt shown in Fig. 3, looking in the direction indicated by the arrows.

In Figs. 3 and 4, I have illustrated a conventional form of automobile seat in which the bottom 5 and the back 6 are not hinged and are shown in fixed permanent relation, and in which the two parts of the belt and attachments thereof are modified and adapted for this form of my invention. Accordingly, I have shown but one eye-plate 16, which is firmly mounted upon the rear wall of said back near its lower right-hand corner firmly secured to the frame thereof. This modified form of belt 17 is constructed in two parts, 17a and 17b; the part 17a having one end 18 affixed to the eye-plate 16, and thereupon the said part passing upwardly is roved slidably through the link 19, and thence turning downwardly and transversely extends forwardly underneath the said back terminates forwardly thereof in its free end 20; and the part 17b being secured to the link 19, and passing over the top 21 of the said back 6 and across the chest of the occupant, has its free end 22 provided with a buckle 23 adapted to be secured to the free end 20 of the part 17a. This form of arrangement is such that upon any shock occasioned by the sudden arrest of the automobile, the body of the occupant will move forward and the belt will become tightened by reason of the noose action thereof and said occupant firmly held in his seat against dislodgement therefrom.

By the words "noose means" as used in the claim, I desire to be understood as meaning a loop with a running connection which serves to bind closer the occupant of the seat the more said loop is drawn, as opposed to a loop which does not so bind and which is merely self adjusting or compensatory in character.

My invention may be embodied in other specific forms without departing from the spirit or essential characteristics thereof. The present embodiments, as above set forth, are therefore to be considered in all respects as illustrative and not restrictive, the scope of my invention being indicated by the appended claim rather than by the foregoing description, and all changes which may come within the meaning and range of equivalency of the claim are therefore intended to be embraced therein.

What I claim and desire to secure by Letters Patent is:

In a safety belt for vehicle seat having a bottom and back hingedly secured thereto, the combination of a belt having two parts slidably connected to each other and to said seat and adapted to encompass the body of an occupant of said seat, and noose means associated with said belt and actuated by the swing of said back for tightening and binding the belt against occupant's body and anchoring the same upon said seat upon a shock being sustained by said vehicle during the forward travel thereof.

References Cited in the file of this patent

UNITED STATES PATENTS

| | | |
|---|---|---|
| 1,971,264 | Irwin | Aug. 21, 1934 |
| 2,280,694 | Embree et al. | Apr. 21, 1942 |
| 2,365,625 | Carlisle | Dec. 19, 1944 |
| 2,576,867 | Wilson | Nov. 27, 1951 |

FOREIGN PATENTS

| | | |
|---|---|---|
| 282,304 | Great Britain | Dec. 22, 1927 |